June 29, 1954  E. W. MACOY  2,682,598
METHOD OF AND APPARATUS FOR KEEPING ELECTRIC
ARCS ALIVE FOR REPEATED WELDING OPERATIONS
Filed Aug. 1, 1952  5 Sheets-Sheet 1

INVENTOR.
EUGENE W. MACOY
BY Charles H. Erne
Leland R. McCann
George W. Reifer
ATTORNEYS

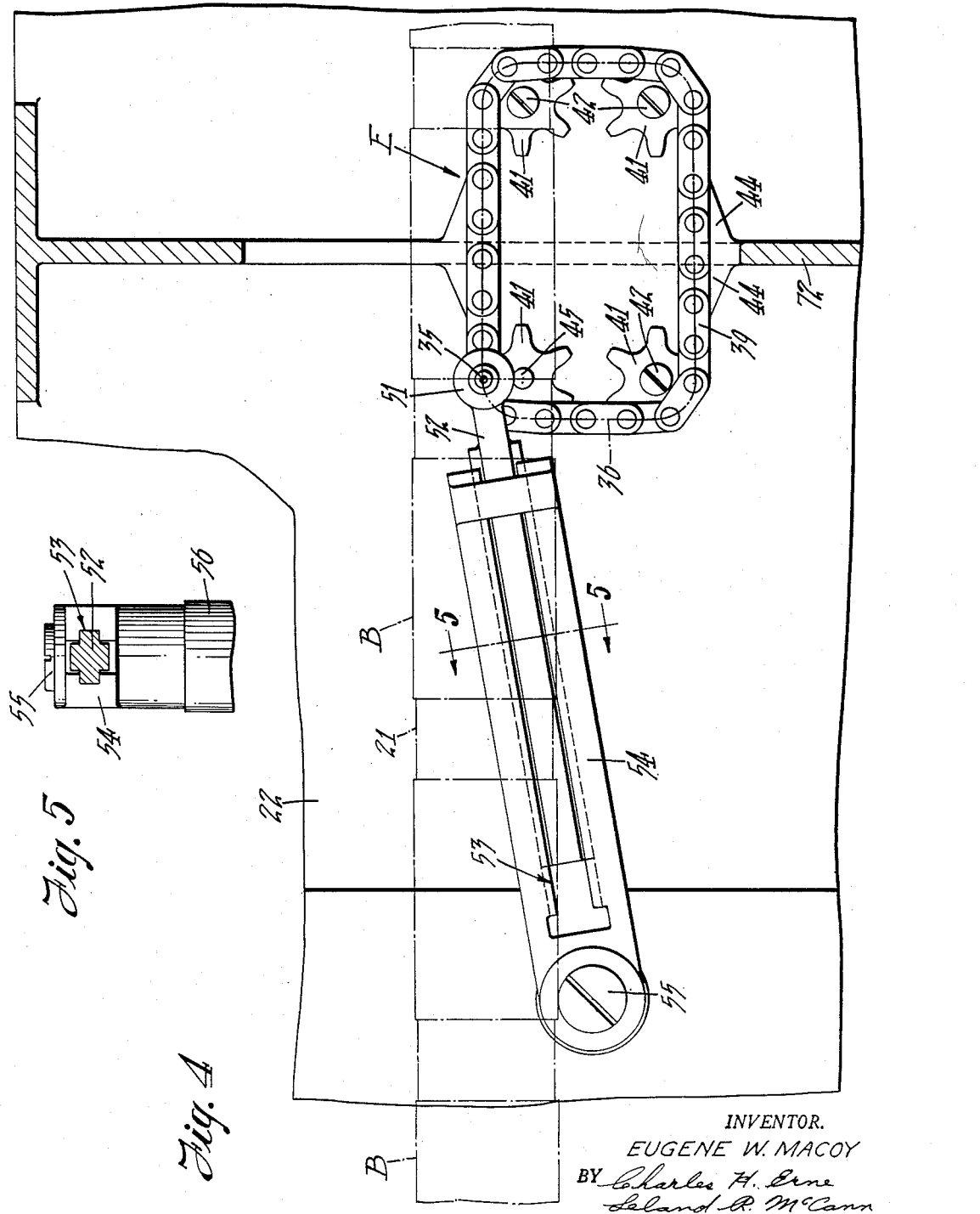

June 29, 1954  E. W. MACOY  2,682,598
METHOD OF AND APPARATUS FOR KEEPING ELECTRIC
ARCS ALIVE FOR REPEATED WELDING OPERATIONS
Filed Aug. 1, 1952  5 Sheets-Sheet 5

TO SOURCE OF
COOLING MEDIUM

INVENTOR.
EUGENE W. MACOY
BY Charles H. Erne
Leland R. McCann
George W. Reiber
ATTORNEYS Patented June 29, 1954

2,682,598

UNITED STATES PATENT OFFICE 2,682,598

METHOD OF AND APPARATUS FOR KEEPING ELECTRIC ARCS ALIVE FOR REPEATED WELDING OPERATIONS

Eugene W. Macoy, Old Greenwich, Conn., assignor to American Can Company, New York, N. Y., a corporation of New Jersey Application August 1, 1952, Serial No. 302,166

9 Claims. (Cl. 219—10)

1

The present invention relates to a method of and apparatus for fusion arc welding seams in articles such as sheet metal can bodies and the like and has particular reference to keeping the arc constantly alive for repeated welding operations.

In arc welding, an arc must be struck or established between an electrode and the work before the welding operation can take place. After striking the arc, a rest period of sufficient duration to permit the arc to become stable is usually required for best results. Where it is desired to perform repeated welding operations on successively arranged articles, such as welding the side seams of can bodies moving in spaced and processional order, the time required to strike and stabilize the arc for each can body is so great as to prohibit the use of such a method of welding.

The instant invention contemplates the provision of a method of and apparatus for maintaining the arc constantly alive so that such repeated welding operations may be performed.

An object of the invention is the provision of a method of and apparatus for arc welding articles wherein the arc, after once being struck and stabilized, is maintained constantly alive so that repeated welding operations on successive spaced articles may be performed rapidly and efficiently with the same arc.

Another object is the provision of such a method of and apparatus for arc welding articles wherein the arc may be made to travel along a circuitous path of travel, a portion of which passes adjacent the work for a progressive welding operation and the remainder remote from the work while maintaining the arc constantly alive.

Numerous other objects and advantages of the invention will be apparent as it is better understood from the following description, which, taken in connection with the accompanying drawings, discloses a preferred embodiment thereof.

Referring to the drawings.

2

Figure 3:
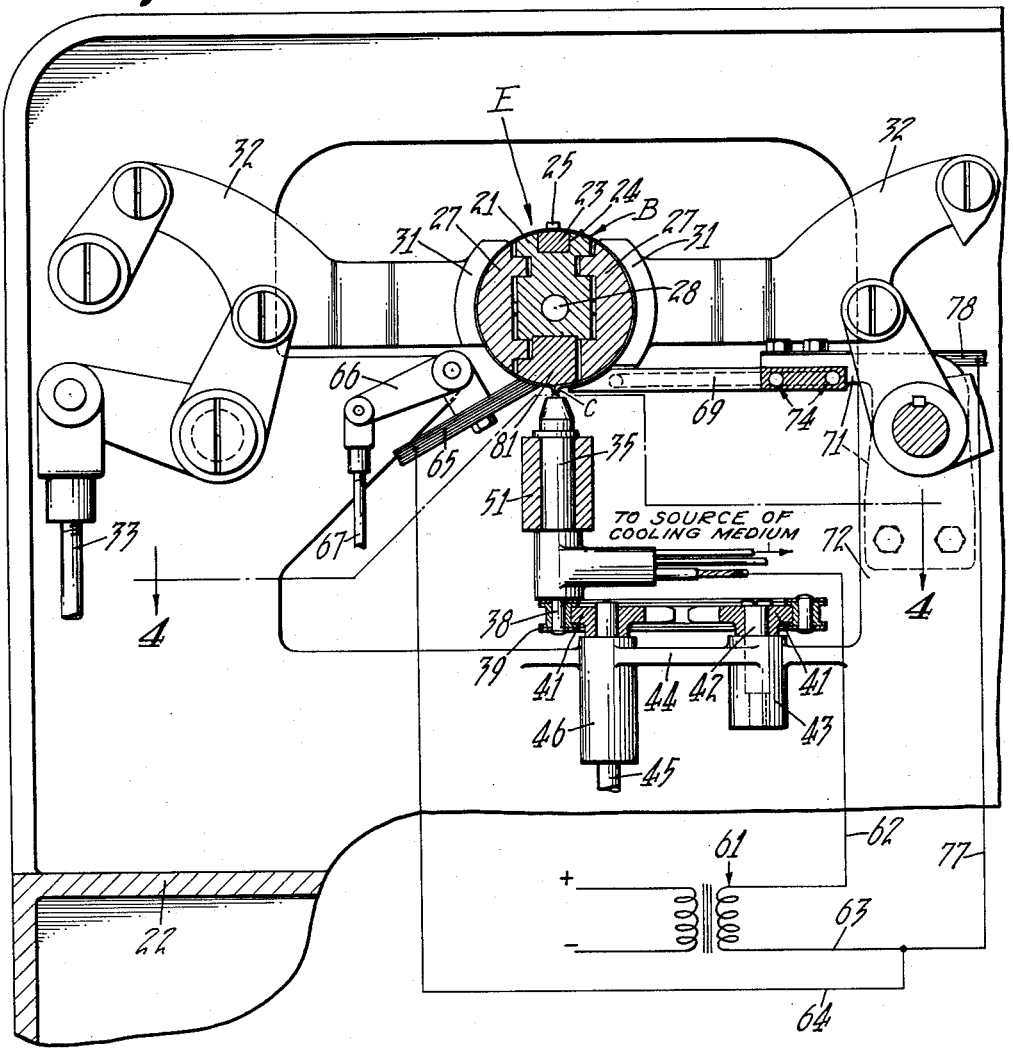
Fig. 3 is a transverse sectional view taken substantially along the broken line 3—3 in Fig. 2, with parts broken away; the view embodying a wiring diagram of the electric devices used in the apparatus.
Figure 6:
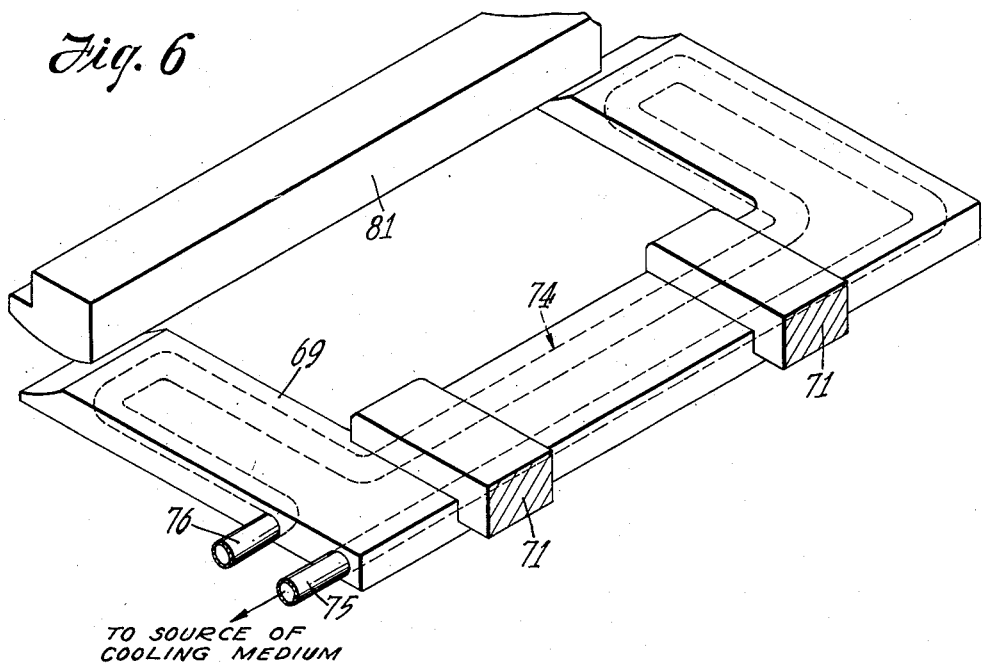
Figure 7:
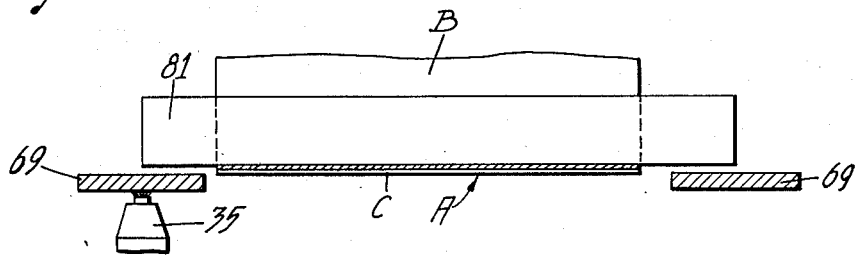
Figure 8:
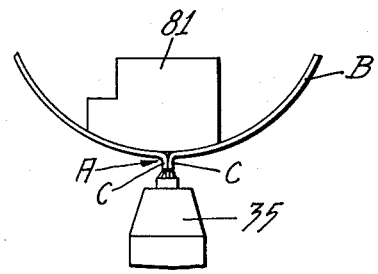

Fig. 4 is a top plan sectional view taken substantially along the broken line 4—4 in Fig. 3, with parts broken away;

Fig. 5 is a sectional detail taken substantially along the line 5—5 in Fig. 4, with a portion broken away;

Fig. 6 is an enlarged perspective schematic view of certain of the parts shown in Fig. 3;

Fig. 7 is a longitudinal schematic section taken through the parts shown in Fig. 6 with an article in position for welding; and Fig. 8 is a schematic end view of the parts and the article shown in Fig. 7.

As a preferred or exemplary embodiment of the instant invention the drawings disclose method steps and apparatus for welding the side seams A (Fig. 8) of cylindrical sheet metal can bodies B arranged in spaced and processional order. To facilitate welding of the seams A, the marginal edge portions of the can bodies preferably are bent outwardly to form flanges C which are compressed or clamped together for the welding operation.

The method of welding the side seams A of the can bodies B in accordance with the instant invention comprises the following steps. The can bodies B are advanced along a predetermined path of travel in endwise relation and in spaced and processional order, with their side seam flanges C preferably disposed at the bottom or under side of the bodies and in longitudinal alignment. Advancement of the bodies B preferably is effected intermittently or in a step-by-step manner, the bodies individually being introduced into a welding station for the welding operation and removed from the station for further advancement or discharge after the welding operation. The bodies preferably are brought to rest at the welding station for the welding operation although if desired the bodies may be welded as they pass through the station.

While a can body is at rest at the welding station or while passing through the station, it is expanded to diametrical size and its side seam edges or flanges C are pressed together and held in this position while they are welded.

The welding is effected by an electric arc which is initially struck between the first can body in the procession and an electrode. The arc is struck at one end of the seam of the first can body and preferably is made to travel along the seam progressively for its full length and then runs off onto an auxiliary member or keep-alive electrode, arcing with this auxiliary member in a return direction remote from the can body and returning to its starting point in time to meet the starting end of the seam of the next can body introduced into the welding station. The keep-alive electrode may be a stationary member or may be movable, as desired.

In this manner the relative movement between the work and the arc effects a complete welding of the seam A of a can body B and maintains the arc constantly alive, by virtue of its continued arcing with the work or with the keep-alive electrode, after its initial establishment, so that a fully stabilized arc is always immediately available for rapid and efficient repetitive welding operations. With the arc thus maintained constantly alive, the side seams A of the can bodies B in the entire procession of bodies are fully welded in rapid succession as the bodies are individually introduced into or passed through the welding station.

Figure 1:
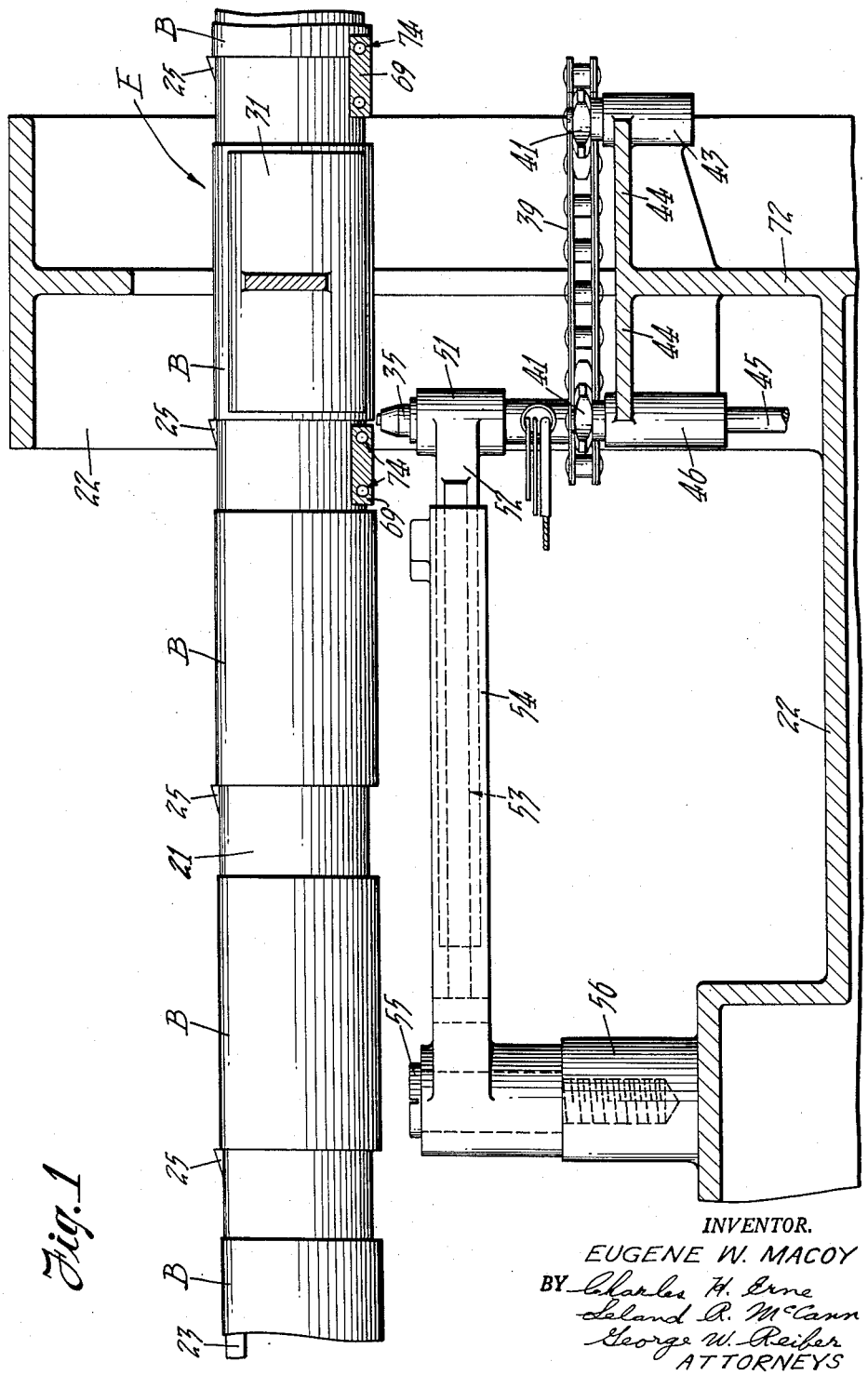
Figure 1 is a side elevation of apparatus embodying the instant invention and for carrying out the method steps of the invention, parts being broken away and shown in section.
Figure 2:
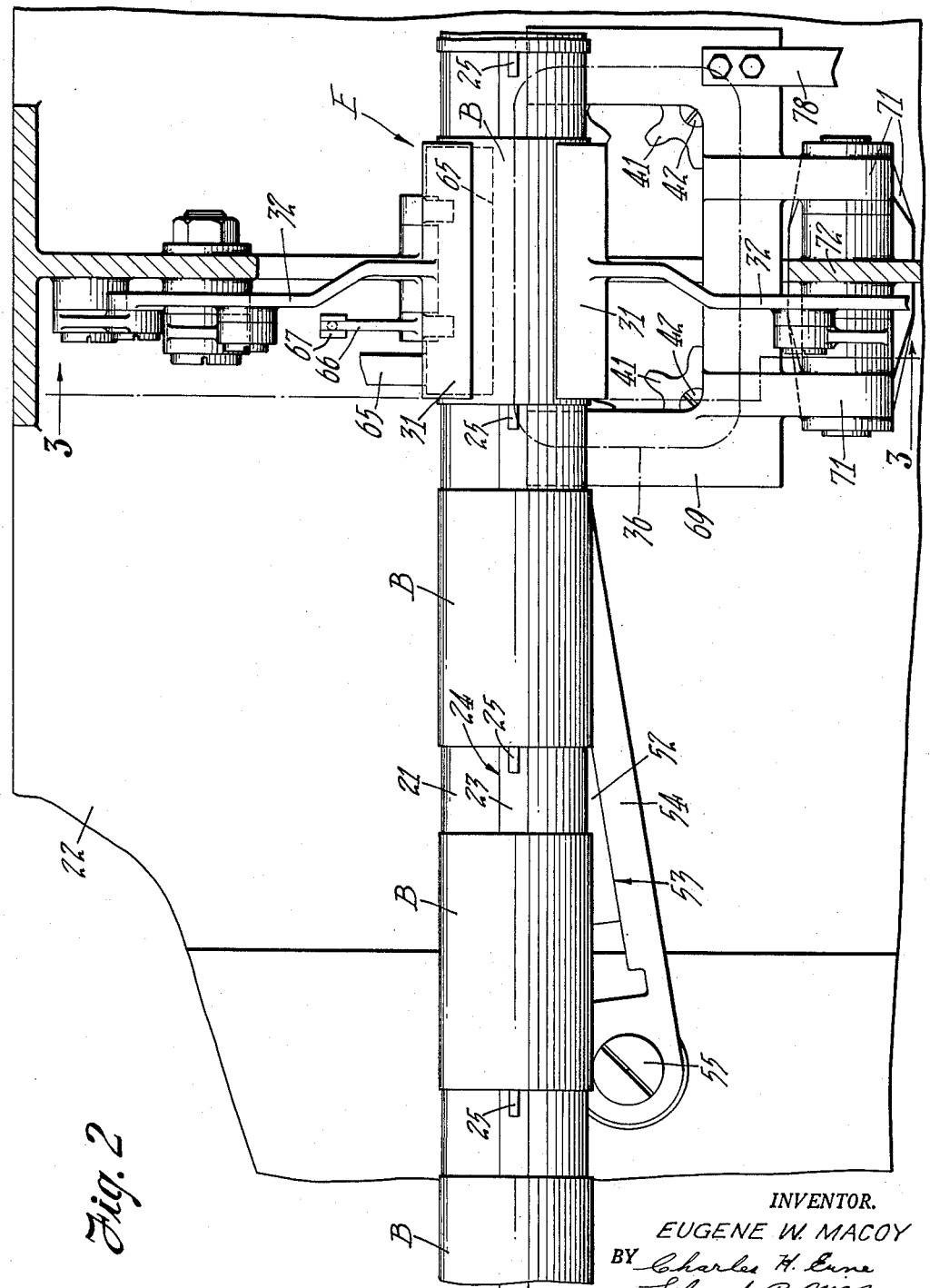
Fig. 2 is a top plan view of the apparatus shown in Fig. 1, with parts broken away and parts shown in section.

One form of apparatus for carrying out the above method steps is disclosed in the drawings. In this form of apparatus, the can bodies B are supported on and are advanced intermittently along a horizontally disposed horn or mandrel 21 (Figs. 1, 2 and 3) fixed in a frame 22, which elements may be part of a more elaborate machine of the character disclosed in United States Patent 1,770,041, issued July 8, 1930, to John F. Peters on Roll Bodymaker.

The bodies B are advanced along the horn 21 by stroke bars 23 which operate in longitudinal grooves 24 formed in the horn and which carry spaced depressible feed dogs 25 for engaging behind the bodies successively. The stroke bars 23 are reciprocated through a feeding stroke (toward the right as viewed in Figs. 1 and 2) and thence through a return stroke in any suitable manner in time with the other moving parts of the machine, preferably in the manner disclosed in the above mentioned Peters Patent 1,770,041. During a feeding stroke of the bars 23 the feed dogs 25 advance all the bodies one step along the horn, positioning one of the bodies at a welding station E.

At the welding station E, the positioned can body B is expanded to diametrical size, the side seam edges or flanges C which are located along the under side of the body are pressed together, and the flanges welded to produce the side seam A hereinbefore mentioned. The expanding of the can body B is effected preferably in the usual manner by expansible plates 27 (Fig. 3) located in the horn 21 and operated by a wedging pin 28 as disclosed in the above mentioned Peters patent.

Pressing together of the side seam flanges C as shown in Fig. 8 preferably is effected by laterally movable curved clamping jaws or wings 31 (Fig. 3) of the character shown in the Peters patent. These wings 31 are located one on each side of the horn at the welding station and partially surround opposite sides of the horn to press the side walls of the can body against the horn and thus force their side seam edges into abutting engagement. The clamping jaws 31 are formed on the inner ends of pivotally mounted levers 32 as disclosed in the Peters patent and are cam actuated in time with the other moving parts of the machine through connecting rods 33 as shown in the Peters patent.

Welding of the side seam flanges C of the positioned and clamped can body B to produce the seam A preferably is effected by fusion of the metal in the flanges C. This fusion weld preferably is made by the so called "Heliarc Method" in which an electric arc is struck between the work and a single electrode, the electrode usually being made of tungsten or some other slow rate destructible material and shielded by helium or argon gas which is blown from a casing surrounding the electrode. The discharged gas surrounds and confines the arc and prevents oxidation of the work during the welding and during the initial cooling period which follows. For this purpose the drawings illustrate a conventional water cooled "Heliarc" electrode 35 (Figs. 1, 3, 4, 7 and 8) of the character disclosed in United States Patent 2,540,811, issued February 6, 1951, to J. D. Cobine on Inert Gas Arc Welding Electrode.

The electrode 35 is vertically disposed immediately below the horn 21 at the welding station and is mounted for travel along a horizontal endless circuitous path 36 (Fig. 2), a portion of which is parallel with and directly under the horn 21 for the full extent of the side seam flanges C of a can body B at the welding station E. This parallel portion of the path of travel is in vertical alignment with the side seam flanges C and is disposed at such a level that the electrode 35 moves along it in closely spaced relation to the flanges C. The remainder of the path of travel is remote from the horn 21 and the can body thereon. For the sake of simplicity the path of travel shown in the drawings is substantially rectangular in configuration with one side of the rectangle parallel with and in substantially vertical alignment with the horizontal axis of the horn 21.

In order to provide for movement of the electrode 35 along this rectangular path of travel in time with the advancement of the can bodies B along the horn 21, the electrode at its base, is mounted on a vertical pivot pin 38 (Fig. 3) which is carried on an endless chain or conveyor 39 (see also Figs. 1 and 4) which operates over a group of four sprockets 41 located at the corners of the rectangular path of travel. Three of the sprockets 41 are idler sprockets and are mounted on pivot studs 42 secured in bosses 43 formed on horizontally disposed webs 44 of the machine frame 22. The fourth sprocket 41 is a driving sprocket and is carried on a vertical rotatable shaft 45 journaled in a bearing 46 formed on one of the webs 44. The shaft 45 is driven continuously in any suitable manner in time with the other moving parts of the machine.

Hence as the shaft 45 rotates the driving sprocket 41, the chain 39 carries the electrode along its circuitous path of travel, moving the electrode along and under the horn 21 for a distance substantially equal to the length of the can body B at the welding station, then moving the electrode in a right angular direction away from the horn, returning the electrode along a path of travel remote from the horn, and thence in a right angular direction toward the horn to the starting point to complete the circuit. This travel of the electrode is effected in time with the advancement of the can bodies B along the horn, so that during the interval in which the electrode is moving back along its return path, a welded can body B is removed from the welding station and an unwelded can is substituted and is ready for welding when the electrode returns to its starting point behind the unwelded can body.

Provision is made to restrain the electrode 35 from turning on its pivot pin 38 to protect the water cooling tubes and wires which connect with the electrode. For this purpose the electrode 35 is mounted in a boss 51 (Figs. 1, 3 and 4) formed on one end of a slide 52 (see also Fig. 5) which telescopes in and operates along a slideway 53 in an arm 54 the other end of which is mounted on a pivot stud 55 carried in a boss 56 which extends up from the machine frame 22.

Welding of the flanges C of the can body B at the welding station E is effected progressively by fusion of the metal in the flanges, by an electric arc established between the flanges and the electrode 35 and traveling longitudinally of the flanges with the electrode as the electrode moves along its path of travel under the horn 21. Electric current for producing the arc may be received from any suitable source such as a transformer 61 (Fig. 3). One side of the transformer is connected by a wire 62 to the electrode 35. The opposite side of the transformer is connected by wires 63, 64 to a movable flexible brush 65 which engages against the outer surface of a can body B at the welding station. The brush 65 is carried on a pivotally mounted lever 66 which is periodically rocked by cam action through a link 67 in time with the advancement of the can bodies along the horn to retract the brush during movement of a can body into and out of the welding station E so as to prevent interference with the movement of the bodies along the horn.

When the brush 65 is in contact with the can body B at the welding station E, the electric current from the electrode 35 jumps across the slight gap between the electrode and the flanges C of the can body and passes along the body to the brush 65 and hence back to the transformer, to complete the circuit and to produce the arc at the gap which welds the flanges together. In order to keep this arc alive when the electrode 35 reaches the terminal end of the can body B and during its travel back to the starting point of the next can body introduced into the welding station, an auxiliary member or keep-alive electrode 69 (Figs. 1, 2, 3, 6 and 7) is provided.

The keep-alive electrode 69 preferably is made of slow rate destructible copper or silver and in general is a substantially flat U-shaped stationary plate located above the return path of travel of the electrode in closely spaced relation to the top end of the electrode so as to produce a slight gap across which the arc may readily jump. This keep-alive electrode 69 is mounted on a pair of brackets 71 which are secured to a vertical web section 72 of the machine frame 22. The terminal ends of the leg sections of the U-shaped electrode are curved to correspond to the contour of the horn 21 as best shown in Figs. 3 and 6 and are disposed close to the horn with just sufficient clearance space between them and the horn to permit a can body to advance along the horn into and out of the welding station E.

A circuitous passageway 74 (Fig. 6) formed in the flat plate or keep-alive electrode 69, along substantially its entire outer edges terminates in inlet and outlet conduits 75, 76 connecting with a suitable source of a fluid cooling medium for cooling the electrode to prolong its usefulness. Electric current is transmitted to the keep-alive electrode 69 by a wire 77 (Fig. 3) which at one end connects with the transformer wire 63 and which at its opposite end connects with a flexible brush 78 secured to the keep-alive electrode.

Hence when the traveling electrode 35 reaches the terminal end of the can body B being welded at the welding station E, the arc rides off the body B and first continues arcing against the horn 21 which is in contact with the body and through the body with the brush 65. A slow rate destructible copper or silver insert member 81 (Figs. 3, 6, 7 and 8) is disposed in the bottom of the horn 21 to facilitate this continued arcing. This member 81 is slightly longer than the can body B and overlaps the terminal ends of the keep-alive electrode 69 as best shown in Figs. 6 and 7.

After the traveling electrode 35 leaves the can body B it moves along the insert member 81 for a short distance and then abruptly moves away from the horn 21 for its return movement to the starting point as explained above. During this movement of the electrode 35, its arc travels along the insert member 81 and then transfers to the keep-alive electrode 69, the transmittal of the electric current from the transformer 61 changing from the circuit which includes electrode 35, brush 65 and wire 64 to the circuit which includes the electrode 35, keep-alive electrode 69, brush 78 and wire 77. As the electrode 35 continues along its return movement and moves toward its starting point on the horn 21, the arc transfers from the keep-alive electrode 69 to the insert member 81 from which it passes to the starting end of the seam flanges of the next can body B which has been introduced into the welding station E while the electrode 35 was travelling through its return movement.

In this manner, provision is made for the continuous arcing of the electric current from the travelling electrode 35 to some member which is electrically connected with the transformer 61, and thus the arc is constantly kept alive and available immediately upon its return to the starting point of the seam of a can body at the welding station, to begin the progressive welding of the seam without having to await the re-establishment and stabilization of the arc.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. The method of fusion welding seams of metal can bodies with an electric arc, comprising the steps of advancing the can bodies in spaced and processional order into and through a welding station, and maintaining said electric arc alive while moving the arc continuously through an endless circuitous path of travel, a portion of said path extending parallel with the seam of a can body at said station to weld said seam and the remainder of said path being remote from said seam and directed toward the starting point of the next following can body advanced into said station.

2. The method of fusion welding seams of metal can bodies with an electric arc, comprising the steps of advancing the can bodies in spaced and processional order into and through a welding station, clamping together the side seam edges of said can body at said station, moving the electric arc in one direction along the clamped side seam edges of said can body at said station to weld said edges together from a starting point to a finishing point to produce a seam, and continuing said arc in a return direction remote from said welded can body and along an auxiliary member disposed at said station and adjacent the path of travel of said can bodies to keep said arc alive while returning said arc to the starting point of the weld to be made on the seam of the next following can body advanced into said station.

3. In a machine for fusion welding seams of metal can bodies with an electric arc, the combination of a support for a can body having a seam to be welded, an electrode disposed adjacent said support, means for effecting relative movement between said can body on said support and said electrode to advance said electrode continuously through an endless circuitous path relative to said body, said path starting at a point adjacent one end of a seam to be welded and extending along said seam and the remainder of said path leading away from said seam and then back to said starting point adjacent the end of the next following seam to be welded, and means for producing an electric arc at the welding end of said electrode and for maintaining said arc throughout the length of said circuitous path for welding said seam as the arc is advanced over said portion of the path along the seam and for keeping said arc alive along the remainder of said circuitous path and therefore available for welding said next following seam.

4. In a machine for fusion welding seams of metal can bodies with an electric arc, the combination of a support for a can body having a seam to be welded, a travelling electrode disposed adjacent said support in alignment with the seam to be welded, means for supplying electric current to said electrode to produce an arc between said electrode and said seam, means for moving said travelling electrode along a predetermined path of travel from a starting point, progressively along said seam to effect movement of said arc along the seam to weld said seam and to continue movement of said electrode back to its starting point along a return path of travel remote from said seam for a repeat welding operation upon a subsequent can body, and means disposed adjacent said return path of travel of said electrode to produce continued arcing of said arc after the completion of said welding operation to constantly keep said arc alive and available for said repeat welding operation.

5. In a machine for fusion welding seams of metal can bodies with an electric arc, the combination of a longitudinal support extending through a welding station for supporting can bodies, means adjacent said support for advancing said can bodies successively into said welding station and for removing them therefrom, a traveling electrode disposed adjacent said support at said welding station, means operable in time with the advancement of said can bodies into said welding station for moving said electrode along the seam of an advanced can body for a welding operation and for returning said electrode remotely from said welded can body and into a position behind the next following can body advanced into said station for a repeat welding operation, means for supplying electric current to said electrode to produce an arc between said electrode and said seam to effect the welding of said seam, and means disposed adjacent the portion of the path of travel of said electrode remote from said seam for producing continued arcing of said arc after the completion of said welding operation to constantly keep said arc alive and available for said repeat welding operation.

6. In a machine for fusion welding seams of metal can bodies with an electric arc, the combination of a support for a can body having a seam to be welded, a travelling electrode disposed adjacent said support in alignment with the seam to be welded, means for supplying electric current to said electrode to produce an arc between said electrode and said seam, means for moving said travelling electrode along a predetermined path of travel from a starting point, progressively along said seam to effect movement of said arc along the seam to weld said seam and to continue movement of said electrode back to its starting point along a return path of travel remote from said seam for a repeat welding operation upon a subsequent can body, and a stationary plate electrode disposed adjacent the return path of travel of said travelling electrode, said plate electrode having portions immediately adjacent said support at the ends of a can body at said welding station and closely spaced relative to said support to permit the advancement of can bodies into and out of said station without interference, to produce continued arcing of said arc after the completion of said welding operation to constantly keep said arc alive and available for said repeat welding operation.

7. In a machine for fusion welding seams of metal can bodies with an electric arc, the combination of a support for a can body having a seam to be welded, a travelling electrode disposed adjacent said support in alignment with the seam to be welded, means for supplying electric current to said electrode to produce an arc between said electrode and said seam, means for moving said travelling electrode along a predetermined path of travel from a starting point, progressively along said seam to effect movement of said arc along the seam to weld said seam and to continue movement of said electrode back to its starting point along a return path of travel remote from said seam for a repeat welding operation upon a subsequent can body, a stationary plate electrode disposed adjacent the return path of travel of said travelling electrode, said plate electrode having portions immediately adjacent said support at the ends of a can body at said welding station and closely spaced relative to said support to permit the advancement of can bodies into and out of said station without interference, to produce continued arcing of said arc after the completion of said welding operation to constantly keep said arc alive and available for said repeat welding operation, and means for cooling said plate electrode.

8. In a machine for fusion welding seams of metal can bodies with an electric arc, the combination of a support for a can body having a seam to be welded, a travelling electrode disposed adjacent said support in alignment with the seam to be welded, means for supplying electric current to said electrode to produce an arc between said electrode and said seam, an endless chain conveyor on which said electrode is mounted for movement therewith, said conveyor having a portion extending along a path of travel in projected alignment with said support and a portion extending along a path of travel remote from said projected alignment, means for actuating said conveyor for moving said travelling electrode along a predetermined path of travel from a starting point, progressively along said seam to effect movement of said arc along the seam to weld said seam and to continue movement of said electrode back to its starting point along a return path of travel remote from said seam for a repeat welding operation upon a subsequent can body, and means disposed adjacent said return path of travel of said electrode to produce continued arcing of said arc after the completion of said welding operation to constantly keep said arc alive and available for said repeat welding operation.

9. In a machine for fusion welding seams of metal can bodies with an electric arc, the combination of a support for a can body having a seam to be welded, a travelling electrode disposed adjacent said support in alignment with the seam to be welded, means for supplying electric current to said electrode to produce an arc between said electrode and said seam, an endless chain conveyor on which said electrode is mounted for movement therewith, said conveyor having a portion extending along a path of travel in projected alignment with said support and a portion extending along a path of travel remote from said projected alignment, means for actuating said conveyor for moving said travelling electrode along a predetermined path of travel from a starting point, progressively along said seam to effect movement of said arc along the seam to weld said seam and to continue movement of said electrode back to its starting point along a return path of travel remote from said seam for a repeat welding operation upon a subsequent can body, means connected with said travelling electrode for holding said electrode against rotation during its movement along its path of travel, and means disposed adjacent said return path of travel of said electrode to produce continued arcing of said arc after the completion of said welding operation to constantly keep said arc alive and available for said repeat welding operation.

References Cited in the file of this patent

UNITED STATES PATENTS

| Number | Name | Date |
|---|---|---|
| 1,512,787 | Morton | Oct. 21, 1924 |
| 1,530,469 | Adams | Mar. 24, 1925 |
| 1,770,041 | Peters | July 8, 1930 |
| 2,466,497 | Smith | Apr. 5, 1949 |